United States Patent [19]

Renold

[11] Patent Number: 4,522,476

[45] Date of Patent: Jun. 11, 1985

[54] MOTION PICTURE FILM GATE AND REGISTRATION SYSTEM

[76] Inventor: Walter Renold, 7044 Mary Ellen Ave., North Hollywood, Calif. 91603

[21] Appl. No.: 624,462

[22] Filed: Jun. 25, 1984

[51] Int. Cl.$^3$ .............................................. G03B 1/48
[52] U.S. Cl. ...................................... 352/225; 226/55
[58] Field of Search ................. 352/225, 224; 226/55, 226/56, 57, 58

[56] References Cited

U.S. PATENT DOCUMENTS 3,914,035 10/1975 Satterfield ........................... 352/225

Primary Examiner—Monroe H. Hayes
Attorney, Agent, or Firm—Ralph B. Pastoriza

[57] ABSTRACT

The film gate and registration system is used for motion picture film that is intermittently transported through a gate from one frame to the next. The arrangement is applicable to both motion picture cameras and projectors. A gate is provided with an aperture having solid marginal edge areas. Spaced pressure pads are arranged to be moved into and out of engagement with a film passing through the film gate. The pads press against the marginal edges of the film when the frame is in its dwell period in the gate either for exposure or projection. When the film is to be transported to the next frame, the pressure pads are withdrawn from the marginal edges and the film is lifted away from the aperture plane. In the preferred embodiment, registration indexing pins closely cooperate with the pressure pads in a special fashion to provide unusually precise positioning of each successive film frame at the end of the transport time.

17 Claims, 21 Drawing Figures

MOTION PICTURE FILM GATE AND REGISTRATION SYSTEM

FIELD OF THE INVENTION

This invention relates to a motion picture film gate and registration system for motion picture film that is intermittently transported through the gate from one frame to the next.

BACKGROUND OF THE INVENTION

In conventional motion picture film movement in both cameras and projectors, successive frames of the film are moved into registration with the film gate aperture and held in position for a given dwell period during which exposure or projection of the film takes place. After the dwell period, the film is transported, either by intermittently operated "pull down" claws or intermittently operated sprocket wheels provided with sprocket teeth. In some systems, captive film loop arrangements are provided for continuous movement of the film from its pay-out reel to its take-up reel with the dwell periods being effected by movement of the captive loop rollers. An example of this latter arrangement is shown in my U.S. Pat. No. 3,613,978.

In all cameras and projectors in which intermittent film movement is involved, some type of pressure or aperture plate is necessary to hold the film steady during the dwell period. Examples of such mechanisms are shown in U.S. Pat. Nos. 1,308,443, 1,692,092, 3,612,674 and 3,914,035. However, none of these patents except 3,612,674 is concerned with relatively large film formats. With large film formats special problems such as flutter can develop as a consequence of the rapid acceleration and deceleration of the film in carrying out the intermittent movement in the film gate. In the case of U.S. Pat. No. 3,612,674 there are lacking registration pins which are essential for high quality reproduction.

BRIEF DESCRIPTION OF THE PRESENT INVENTION

With the foregoing in mind, the present invention contemplates the provision of a greatly improved film gate and registration system for motion picture film that is intermittently transported through the gate from one frame to the next. Very accurate indexing of successive film frame registration is assured. Further, this system minimizes the possibility of film flutter.

Briefly, there is provided a film gate having an aperture with solid marginal edge areas. Pressure pad means are provided together with means for moving the pressure pad means towards the film gate in a direction to press marginal edges of the film against the solid marginal edge areas of the film gate. By this arrangement, the film is firmly held during the dwell time of the film and the aperture. The same means provides for lifting off the pressure pad means from the marginal edges of the film to permit transport of the film to the next frame. Further, means are provided to lift the film away from the plane of the aperture prior to transport of the film to prevent scratching of the film during transport. In addition means are provided to inhibit vibration or flutter of the film portion displayed in the film gate aperture.

BRIEF DESCRIPTION OF THE DRAWINGS

A better understanding of the foregoing as well as further features and advantages of the present invention will be had by now referring to the accompanying drawings in which.

DETAILED DESCRIPTION OF THE INVENTION

Figure 1:
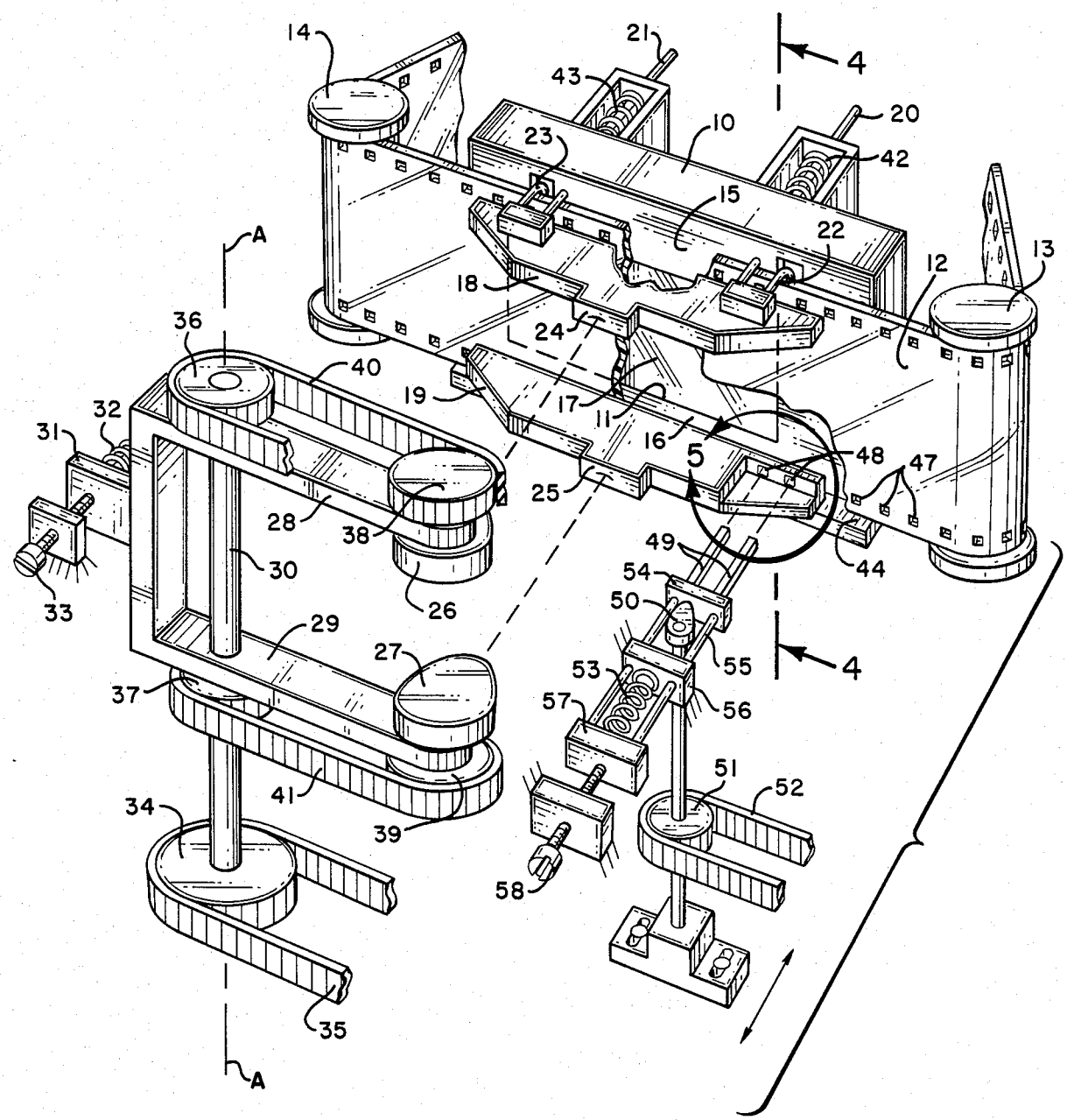
FIG. 1 is a schematic perspective view of a preferred embodiment of the film gate and registration system of this invention.

Referring first to the preferred embodiment of FIG. 1, there is shown a film gate 10 having a central aperture 11 over which film 12 moves. Towards this end, there are provided guide rollers 13 and 14 for the film 12. In the particular embodiment disclosed, film 12 travels horizontally from right to left as viewed in FIG. 1. Horizontal film movement is utilized in large format projections so that a large image or frame can be defined on the film, the long dimension of the frame running in the longitudinal direction of the film itself.

As briefly described heretofore, it will be understood that the film 12 is intermittently transported through the gate from one frame to the next. This movement as also stated heretofore, can be accomplished by a captive loop film movement mechanism utilizing moving rollers, or by intermittent sprockets or claws corresponding to the conventional pull down means used in vertical film movement systems. If a captive loop movement is used, rollers 13 and 14 will be moving, and with the other movements, they will be fixed.

Still referring to FIG. 1, it will be noted that the aperture 11 is provided with upper and lower smooth flat marginal edges 15 and 16, illustrated in the broken away portion of the film. A glass plate 17 is held in the aperture 11 with its front surface coplanar with the marginal edges 15 and 16.

Cooperating with marginal edges 15 and 16 are upper and lower pressure pads 18 and 19 in spaced parallel relationship, the spacing between the pads corresponding to the vertical frame spacing on the film 12; that is, the upper and lower pads will only engage the marginal edges of the film outside the image area.

The pads 18 and 19 in the preferred embodiment illustrated are movable towards and away from the referred to marginal edges 15 and 16 and towards this end, there are provided guide pins indicated at 20 and 21 extending from the top surface of the pad 18 through the film gate 10 and out the rear thereof. These guide pins accurately index the motion of pad 18 away from and towards the film gate. In addition to the guide pins 20 and 21, the top of the pad 18 carries hook means indicated at 22 and 23 engaging about the top marginal edge of the film 12 so that when the pad 18 moves away from the film gate, these hook means will pull or lift the film away from the plane of the aperture so that the film can be transported without risk of scratching. In the preferred embodiment of FIG. 1, the pad 18 includes a central cam follower surface 24 against which appropriate camming means bear to effect the movement of the pad, all as will be described.

The lower pressure pad 19 includes a similar arrangement of guide pins and hook means on its underside (not visible in FIG. 1). This lower pad means also has a cam follower surface 25 for cooperation with an appropriate camming means so that it will follow the same motion as the upper pad 18.

The camming means or means for moving the pads 18 and 19 towards and away from the film gate 10, are shown exploded away from the pads in order to avoid obscuring components of the apparatus shown. This camming means includes upper and lower cam wheels 26 and 27 rotatably mounted at the ends of upper and lower arms 28 and 29 pivoted as by shaft 30 about intermediate points for rotation about vertical axis A—A. The opposite end of the arms connect together and to an extension member 31. A compression spring 32 urges the member 31 in a direction such that pivoting movement of the arms 28 and 29 will urge the cam wheels 26 and 27 into engagement with the cam follower surfaces 24 and 25 of the pad members. A stop means in the form of an adjustable stop pin 33 will limit the pivoting movement of the arms about the axis A—A in a direction towards the pads.

Rotation of the upper and lower cam wheels 26 and 27 is accomplished by rotation of a lower pulley 34 by drive belt 35 thereby rotating shaft 30. Additional pulleys 36 and 37 connected to the shaft 30 rotate end pulleys 38 and 39 respectively by means of belts 40 and 41. Pulleys 38 and 39 are coaxial with and connected to the upper and lower cam wheels 26 and 27 so that continuous rotation of the pulley 34 will result in continuous rotation of the cam wheels 26 and 27.

Referring once again to the upper portion of FIG. 1, there are provided compression springs 42 and 43 for urging the guide pins 20 and 21 in a direction to move the pressure pads such as the pad 18 away from the aperture. It will be appreciated, accordingly, that when the camming wheels 26 and 27 are in one rotated position, permitting outward movement of the pads 18 and 19, the springs 42 and 43 will effect this movement, the hook means indicated at 22 and 23 lifting the film 12 away from the aperture. Where the film is running in a horizontal direction as illustrated in FIG. 1, the gate 10 itself preferably includes a lower ledge indicated at 44 which will aid in supporting the lower edge of the film 12 in its movement during transport.

Figure 2:
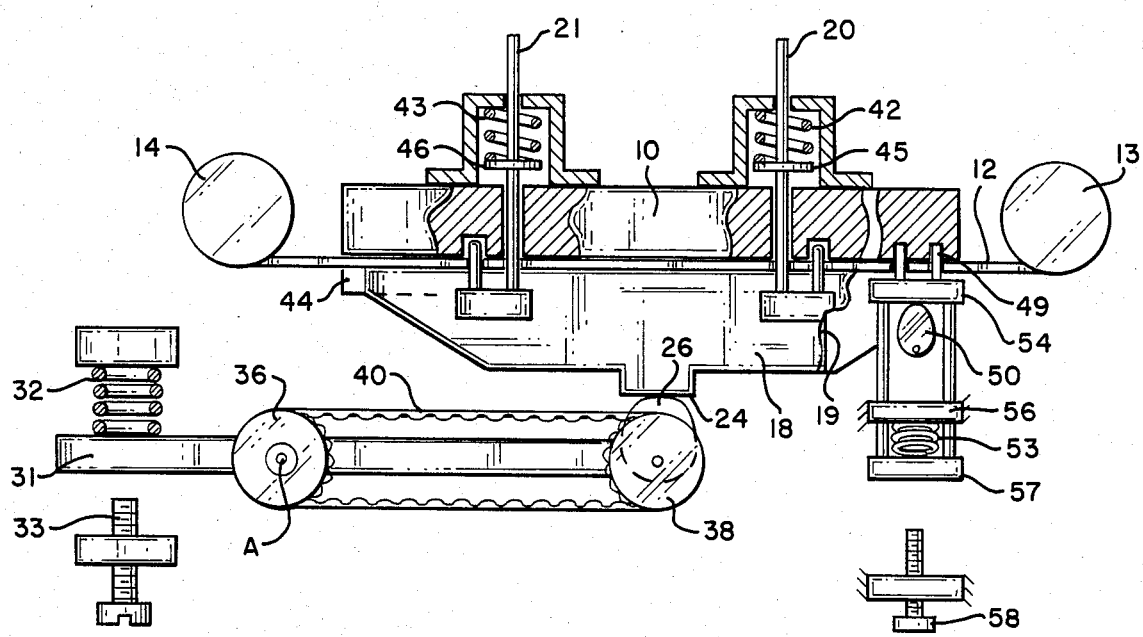
FIG. 2 is a plan view partly broken away of FIG. 1 showing the position of a film frame during the dwell period.

The arrangement and action of the springs 42 and 43 can best be seen in FIG. 2 wherein there are shown collar stops 45 and 46 secured to the pins 20 and 21 respectively for engagement by the springs 42 and 43. The arrangement as will be evident permits the springs 42 and 43 to exert the referred to biasing force on the pins 20 and 21 to urge the pad 18 away from the gate.

Referring to the left portion of FIG. 2, the compression spring 32 described briefly in FIG. 1, is a much more powerful spring than the springs 42 and 43 so that when it exerts a force on the extending end 31 of the arm structure, the camming wheels such as the wheel 26 will be urged into engagement with the pads. Rotation of the cam wheels to move the protruding portion against the pads will then cause the pad to firmly engage the marginal areas of the aperture and hold the film firmly during the dwell period.

When the cam wheels continue to move so that the bulging portion leaves the cam follower surface of the pad, the pad will still be held in engagement with the film by the powerful spring 32 tending to pivot the arms about the axis A—A. Thus, for a moment at the entrance and exiting of the bulge on the cam wheel 26 the pads will continuously be held against the marginal edges of the film.

Figure 3:
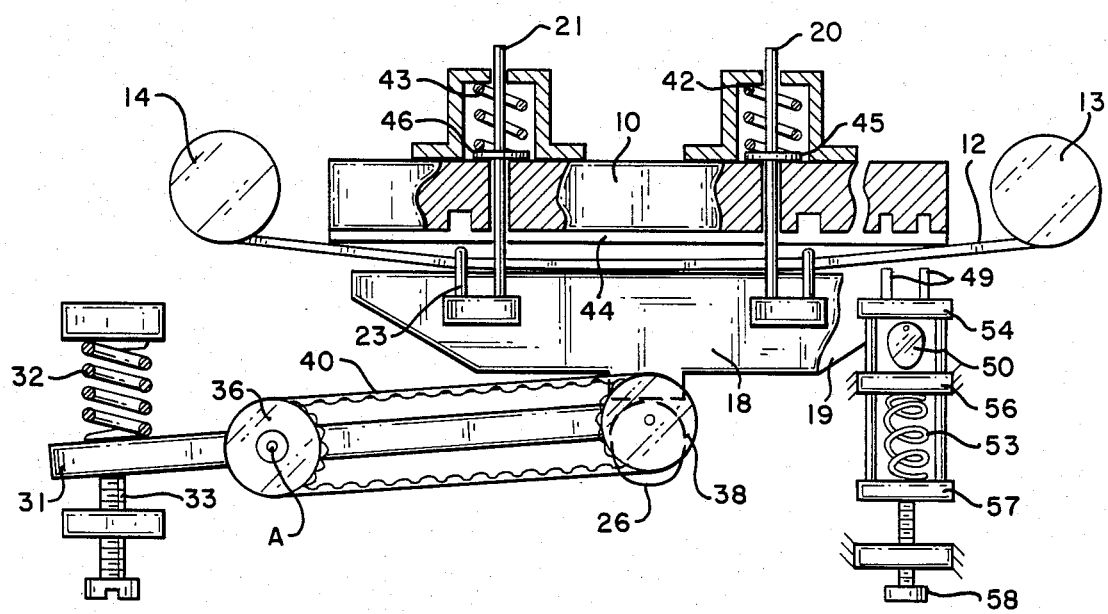
FIG. 3 is a view similar to FIG. 2 showing the position of the film during transport from one frame to the next.

As the bulge in the cam wheel leaves the cam follower surface of the pad, the extent of the pivoting action of the arms is such that the extending end 31 now engages the stop screw 33 as illustrated in FIG. 3. At this point, the compression spring 32 can no longer effect any pivoting action of the arms and when the cam wheel 26 starts to separate from the cam follower surface, the first mentioned springs 42 and 43 on the back of the gate will urge by way of the pins 20 and 21 the pad 18 away from the film gate plane, the pad bearing against the cam until the stops 45 and 46 on the pins engage the rear of the gate. Thereafter, the cam will separate completely from the pad when in its position shown in FIG. 3. The hooks 22 and 23 move with the pad to free the film for transport.

It is to be understood that the cam wheel bulge portion 26 after leaving the cam follower surface of the pad continues to rotate about its axis until it will again engage the pad. When the pad 18 is initially engaged, it will be urged against the marginal edges of the aperture to hold the film firmly and as the cam wheel 26 continues to rotate, since the pad is already seated, the arms will pivot about the axis A—A against the action of compression spring 32, the extending end 31 leaving the stop screw 33. The cycle started with FIG. 2 will then again be repeated. Summarizing the provision of the compression spring 32 and stop screw 33 and the pivoting arrangement of the arms allows for the pads 18 to be firmly held against the film throughout a dwell period which overlaps in time the times that the bulge in the cam wheel 26 is at its maximum extended position against the pad 18 as shown in FIG. 2.

Referring back to FIG. 1 and particularly the lower right portion thereof, there is shown exploded away from the gate 10 a registration pin means. This registration pin means cooperates with film perforations shown at 47 and cooperating lower pad guide holes 48 which are spaced to register with the sprocket holes 47 of the film when the film is in its proper dwell position.

The registration pin means itself includes a pair of registration pins 49 arranged to be received in the openings 48 and the film perforations 47 during the dwell period. These registration pins 49 are moved towards and away from the film gate by an appropriate cam wheel 50 driven by a drive pulley 51 and belt 52. The belt 52 is driven by a second pulley in a fixed mount (not shown). The drive pulley 51 is mounted to a shaft in turn secured to the frame of the projector in a manner permitting adjustment towards and away from the film gate as indicated by the double-headed arrow.

The registration pins 49 are held in a block 54 which is also a cam follower. The block 54 is attached to one end of the guide posts 55 which are slidably mounted in fixed frame 56. At their other ends, the guide posts 55 are attached to a rear block 57 which is biased by the compression spring 53. The block 54 is thereby biased against the cam wheel 50 through the connecting guide posts 55. The motion of the rear block 57 and thus the registration pins 49 away from the film gate is limited by the adjustable stop screw 58.

In the broken away plan view of FIG. 2, the registration pins are engaging the film perforations, and are held in that position as the bulge of the cam wheel 50 presses against the block 54, while spring 53 is caused to be compressed.

In the top fragmentary cut-away view of FIG. 3, the registration pins 49 are shown retracted from the film perforations. In this instance the shallow portion of the cam wheel 50 is facing the follower block 54 thereby permitting the spring 53 to move the rear block 57 until it is stopped by the stop screw 58. The cam is thus lifted free of the block 54.

It is to be noted that in FIGS. 2 and 3, the illustration of the pad mechanism shows the upper pad 18 which is broken away at the right hand portion to expose the lower pad 19. By this means, the manner in which the registration pin mechanism operates is made clear.

Figure 4:
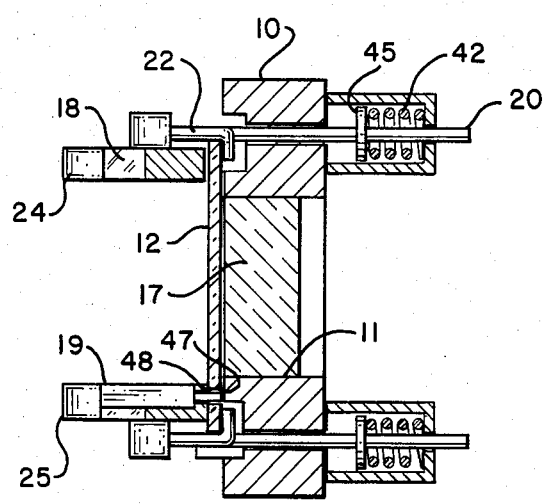
FIG. 4 is a cross section taken on the lines 4—4 of FIG. 1 of the film gate structure.

Referring now to the cross section of FIG. 4, the registration of the opening 48 in the lower pad 19 with the film sprocket holes 47 is evident. Further, the provision of guide pins and hook means on the underside of the lower pad 19 is clearly shown in FIG. 4.

Figure 5:
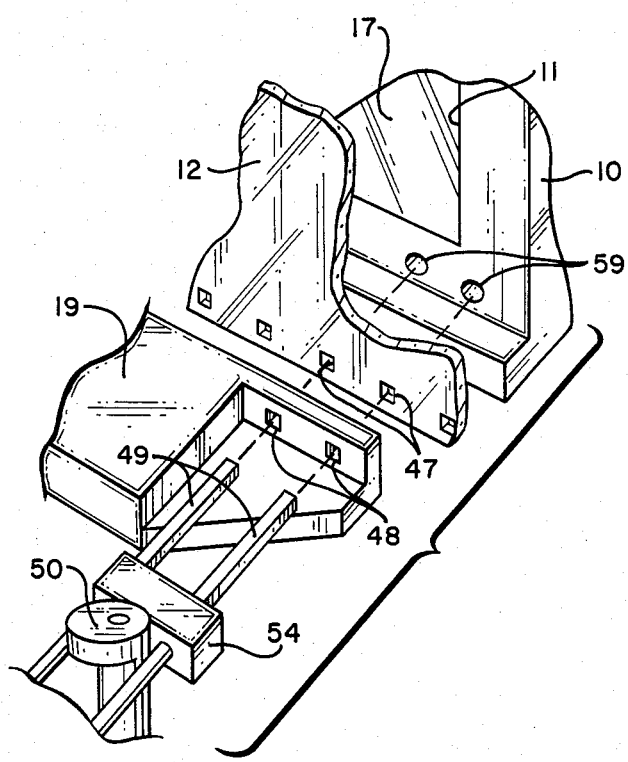
FIG. 5 is an enlarged fragmentary perspective view of a portion of FIG. 1 enclosed within the circular arrow 5.

With specific reference to the enlarged exploded perspective view of FIG. 5, it will be appreciated that when the registration pins 49 are moved through the openings 48 in the pad 19 and film sprocket perforations 47, there may be provided further end openings 59 in the film gate 10 to receive the pointed ends of the registration pins 49 since the film 12 is flush against the marginal edges of the aperture 11. As the pins 49 are withdrawn, the peripheral edges of the openings 48 facing the film 12 will serve to "strip" the film 12 from the registration pins 49. This stripping of the film 12 from the registration pins 49 by means of the openings 48 in the lower pad 19 constitutes an important feature of this invention as it assures a clean separation of the film from the registration pins, the film being thence moved away from the aperture plate for transport, while during the dwell period, the same pad surfaces press the film areas surrounding the registration pins against the film gate.

Figure 6:
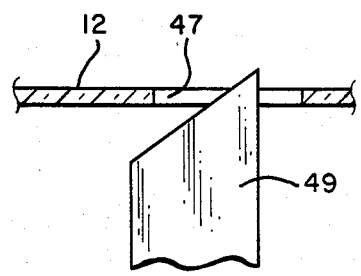
FIG. 6 is a greatly enlarged fragmentary view illustrating the initial entrance of a registration pin in a film perforation.

Referring now to FIG. 6, there is shown in detail one of the registration pins 19 having a sloping edge. If the direction of the film movement as viewed in FIG. 6 is from left to right, it wil be evident that it is possible for an initial portion of the registration pin 49 to enter the sprocket hole 47 while the film is still in motion. In FIG. 6, such partial entry is illustrated. It will be understood that as the registration pin 49 continues in an upward direction as viewed in FIG. 6, the right hand end of the sprocket hole 47 will engage the right edge of the registration pin 49 so that the film will be brought to a stop in a precise location relative to the aperture. The pressure pad will then be brought into engagement with the film to hold the same firmly.

Referring back to FIG. 1, the rollers 13 and 14 are provided with resilient high friction surfaces extending throughout the entire width of the film 12. These high friction surfaces will support the film in a manner to prevent it from fluttering.

Figure 7:
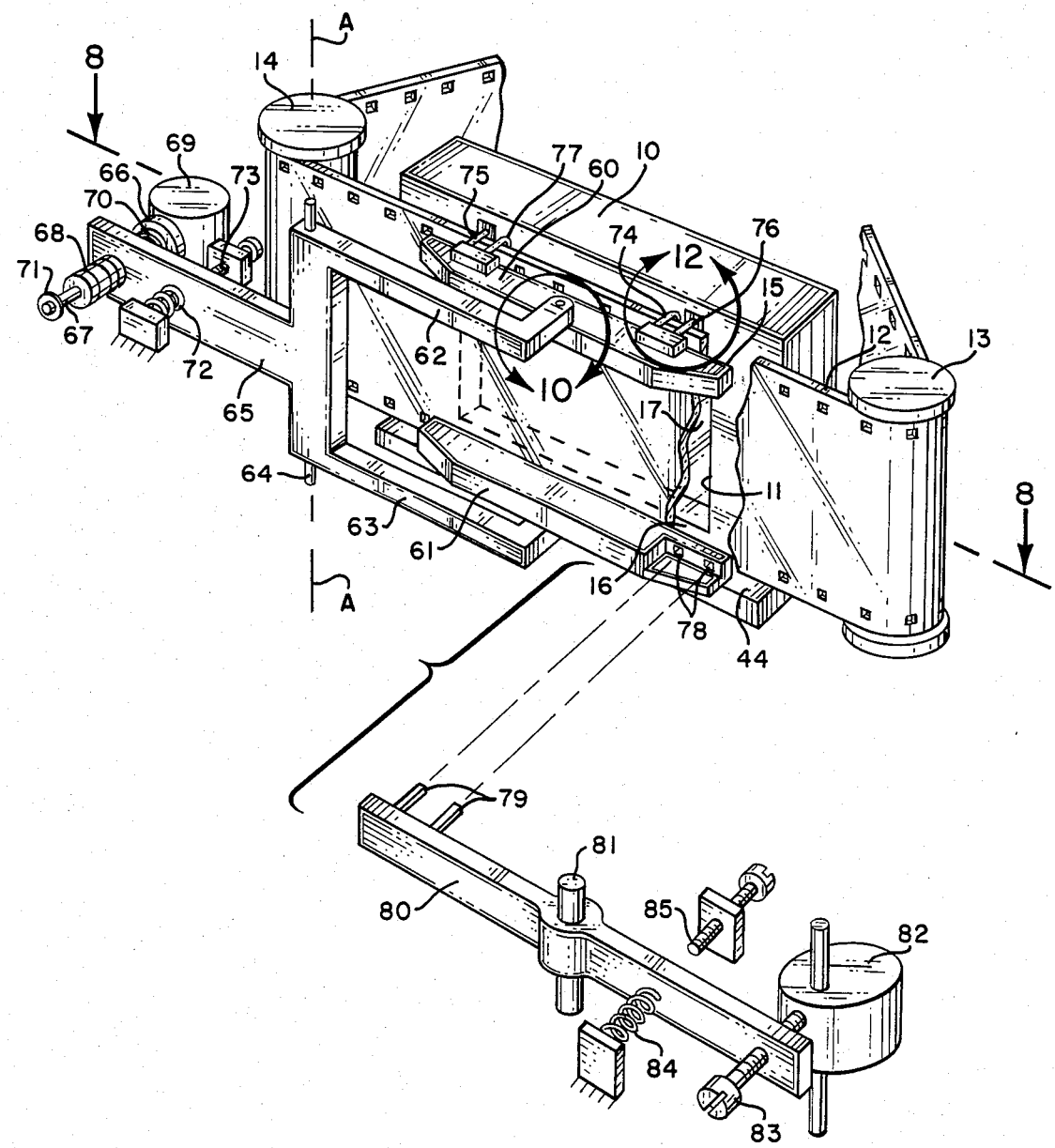
FIG. 7 is a schematic perspective view similar to FIG. 1 but illustrating a second embodiment of the invention.

Referring now to FIG. 7, there is shown a second embodiment of the invention wherein a different pressure pad arrangement and means for moving the same are illustrated. In addition, a different means for moving the registration pins is shown. The film gate, film and guide rollers for the film are all the same as described with respect to the embodiment of FIG. 1 and the same numerals designating corresponding parts are used.

Thus, in the modified pressure pad and moving means there are again provided upper and lower pressure pads designated 60 and 61 carried on the extending ends of arms 62 and 63. These arms are pivoted for rotation about an axis A—A at 64, an extending end on the other side of the pivot axis being designated at 65.

This extending end carries a cam follower 66 with a shaft extension 67 which slides in a hole inside an adjustable mounting screw 68. This cam follower is biased into engagement with a cam wheel 69 as by compression spring 70. A stop washer 71 at the end of shaft extension 67 limits the cam follower's travel within the hole in screw 68 when urged by spring 70. A second compression spring 72 urges the arm 65 in a clockwise sense and a stop screw 73 limits the arm's travel.

Rather than guide pins extending all the way through the gate 10 as in the embodiment of FIG. 1, there are provided shorter guide pins 74 and 75 for guiding movement of the upper pad 60 towards and away from the film gate 10. Also, there are provided hook means 76 and 77 for lifting the film away from the film gate when the pad is moved away from the gate. Similarly, guide pins and hook means are provided on the underside of the lower pad 61. This lower pad includes a cut-out area defining opening 78 serving the same function as the openings 48 in the lower pad of the embodiment of FIG. 1.

Referring to the lower right portion of FIG. 7, the modified registration pin actuating mechanism includes registration pins 49 mounted at one end of an arm 80 pivoted about fulcrum 81. A cam wheel 82 engages an adjustable follower screw 83 mounted on the other end of the arm 80. Follower screw 83 is urged against the cam wheel by compression spring 84. An adjustable stop screw 85 limits the rotational movement of the ar 80 towards the cam 82 all to the effect that when the bulge of the cam engages the follower screw, the registration pins are inside the film perforations. When the shallow portion of the cam faces the follower, the registration pins are withdrawn through action of the spring 84. The extent of the motion is limited when the structure reaches the stop screw 85 thus causing the cam wheel 82 to lift off the follower 83. This action will become clearer as the description proceeds.

Figure 8:
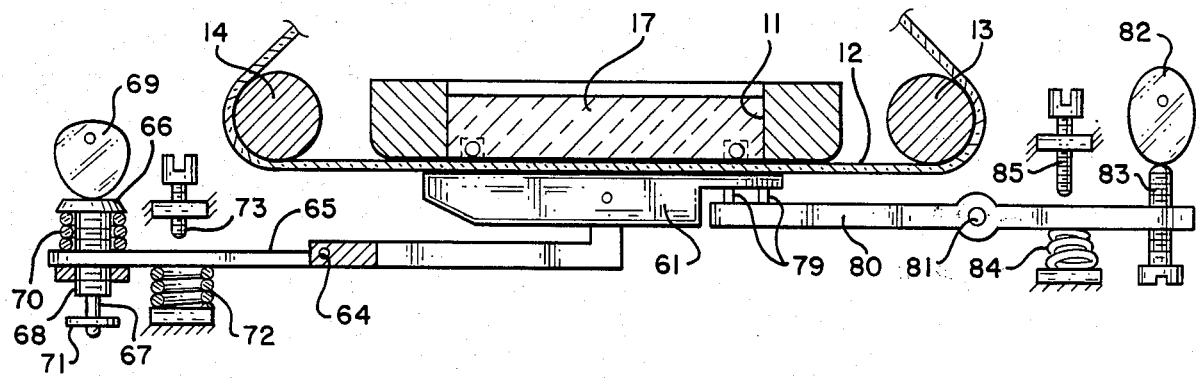
FIG. 8 is a plan view in cross section of FIG. 7 showing the position of the film frame during the dwell period.
Figure 9:
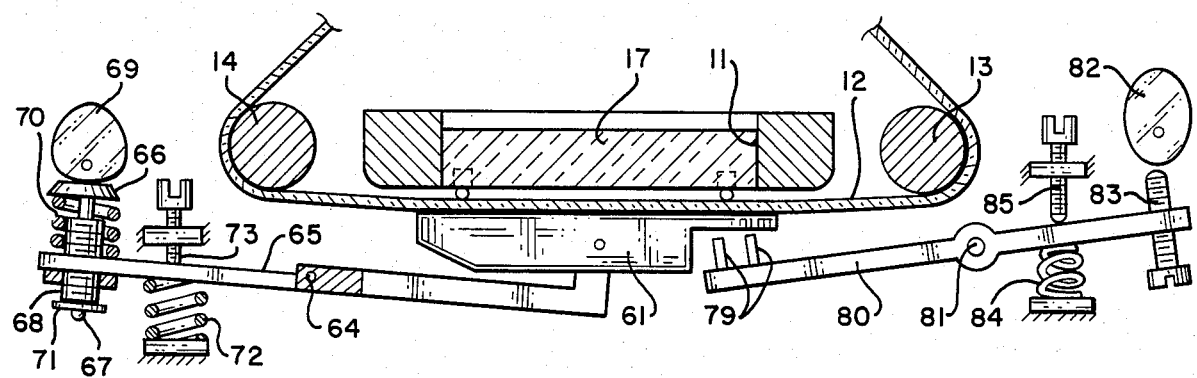
FIG. 9 is a view similar to FIG. 8 showing the position of the film during transport from one frame to the next.

FIGS. 8 and 9 illustrate the manner in which the pads are moved towards and away from the film gate by the arm mechanism described in FIG. 7 and also illustrate the action of the registration pins on the arm 80.

Referring first to FIG. 8, the pads such as the lower pad 61 is shown pressing the film 12 against the lower marginal edge area of the film gate. In addition, the registration pins are shown operated by the bulge on the cam 82 in their inserted position to index the film during the dwell period.

At the end of the dwell period, the cam wheel 69 shown to the left in FIGS. 8 and 9 serving the pressure pads rotates to the position shown in FIG. 9 permitting the stop washer 71 of the follower shaft 67 to limit the travel of the cam follower 66 so that the cam 69 will lift off the follower as shown. The spring 72 has now rocked the arms about the pivot point 64 until the extending end engages the stop screw 73. In this position, the pad 61 is moved away from the film gate and the film is ready for transport. It will also be noted in FIG. 9 that the registration pins have been withdrawn by action of the compression spring 84 and the new position of the cam wheel 82.

In order that the pads such as the pad 61 can follow the rectilinear motion to which they are restrained by the guide pins 74 and 76 described in FIG. 7, while actuated by the end of the arm which follows a slightly arcuate path, it is necessary to provide an accommodation.

Figure 10:
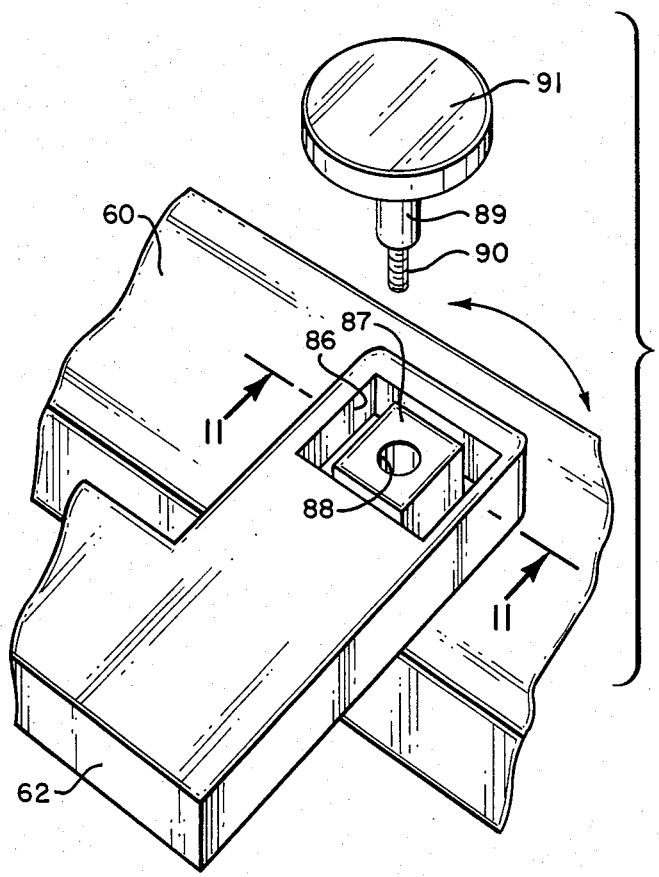
FIG. 10 is a greatly enlarged fragmentary perspective view of a portion of FIG. 7 enclosed within the circular arrow 10.

One type of accommodation or coupling of the arm end to the pads for accomplishing the foregoing is illustrated in the enlarged fragmentary perspective view of FIG. 10 for the upper pad 60. As shown, the extending end of the arm 62 includes a rectangular cut-out or window 86 in the central portion of which there is positioned a block 87. Block 87 has a vertical bore 88 for receiving a shaft 89. The lower end of shaft 89 is threaded at 90 to be secured to the pad 60 while the upper end of the shaft 89 has an enlarged flange or head 91.

Figure 11:
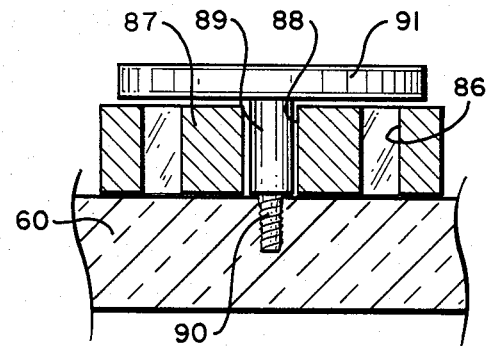
FIG. 11 is a fragmentary cross section taken on the lines 11—11 of FIG. 10.

When the foregoing elements are assembled, they have the appearance of FIG. 11 wherein it will be evident that the rectangular opening or window 86 at the end of the arm 62 described in FIG. 10 can translate within the space between the block 87 and the inside surface of the window 86. In addition, the block 87 can rotate along with the window 86 about the shaft 89. The coupling thus provides for both slight arcuate or rotational movement and translational movement of the pad 60 relative to the extending end of the arm 62.

Figure 12:
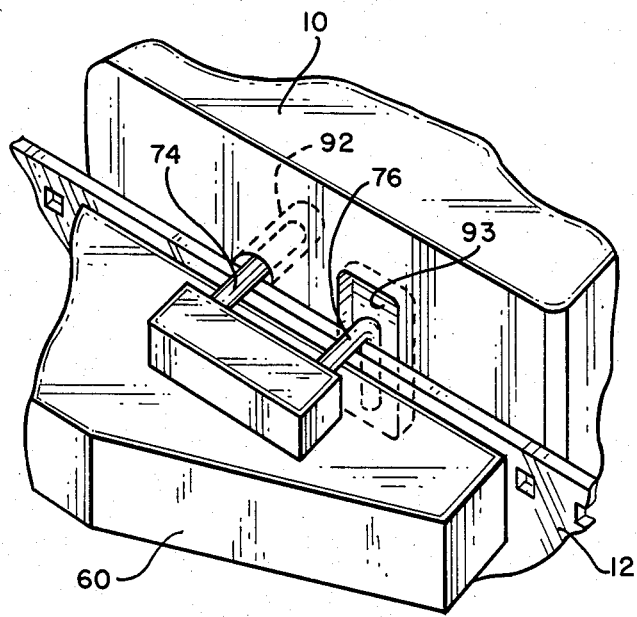
FIG. 12 is an enlarged fragmentary perspective view of that portion of FIG. 7 enclosed within the circular arrow 12.

FIG. 12 shows in greatly enlarged view the limited extent of the guide pin 74 which, rather than extending entirely through the gate 10 simply rides in a journalling bore 92 of sufficient length to accommodate the in and out movement of the pad 60. The hook 76 is clearly shown in FIG. 12 for engaging the edge of the film 12 to lift the film away from the plane of the aperture when the pad 60 is moved away. A small cavity 93 is formed in the film gate for receiving the hook 76 when the pad 60 is pressing in full contact the marginal edge of the film against the marginal edge of the aperture.

Figure 13:
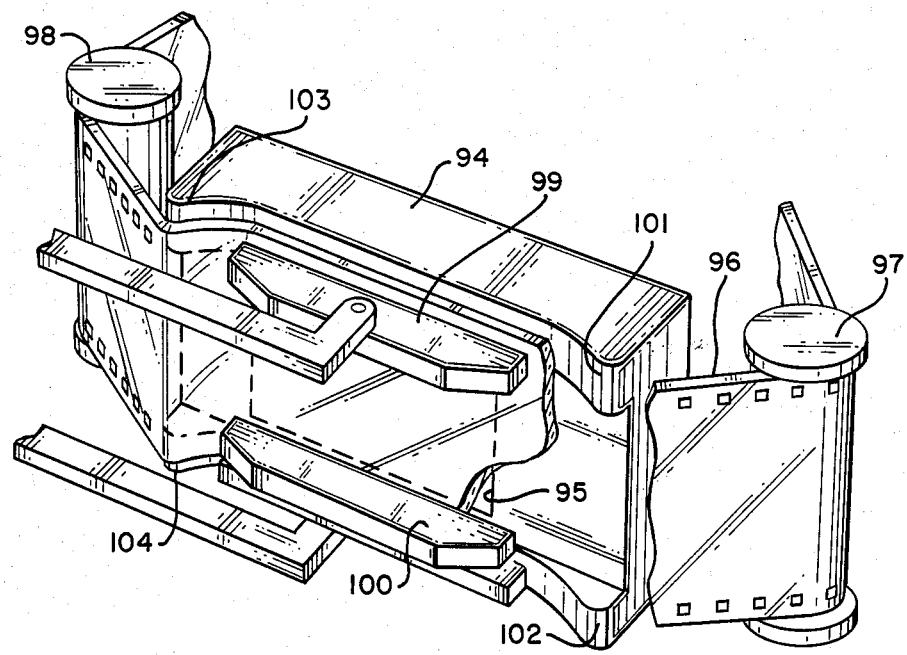
FIG. 13 is a schematic fragmentary perspective view of a third embodiment of the invention.

Referring to FIG. 13, there is provided a modified gate 94 having an aperture 95 along which a film 96 is moved as by guide rollers 97 and 98. Upper and lower pressure pads 99 and 100 are provided and may operate in the same manner as those described for the embodiments of FIGS. 1 or FIG. 7.

In accord with the embodiment of FIG. 13, the film gate includes smoothly defined protrusions 101, 102 and 103, 104 adjacent to the entrance and exit ends of the aperture 95. These protrusions constitute raised portions from the planes of the aperture 95 so that when tension is placed on the film to transport the same, the raised portions will lift the film away from the marginal edge areas of the aperture.

Figure 14:
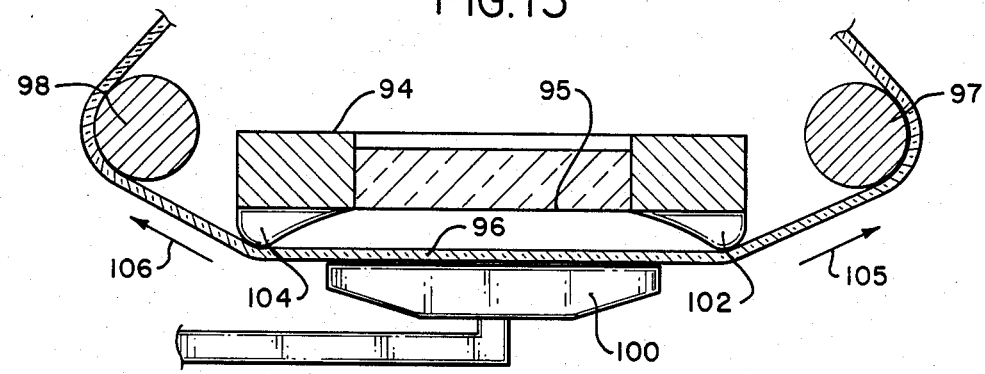
FIG. 14 is a plan view in cross section of the structure of FIG. 13 showing the position of a film during transport from one frame to the next.

The foregoing action is illustrated in FIG. 14 wherein the pressure pads have been moved away from the aperture and the film 96 itself is lifted away from the plane of the aperture 95 as a consequence of the protrusions indicated at 102 and 104 and tension in the film indicated by the arrows 105 and 106 resulting during the transport of the film.

It will be understood in FIG. 14 that the dimensions of the protrusions have been exaggerated as well as the distance that the film moves away from the aperture. This same exaggeration is also utilized in the earlier drawings in order to make the action clear. In actual construction, the movement would be very slight simply in order to have the film lifted away from the glass plate in the aperture so as to avoid scratching during its transport.

Figure 15:
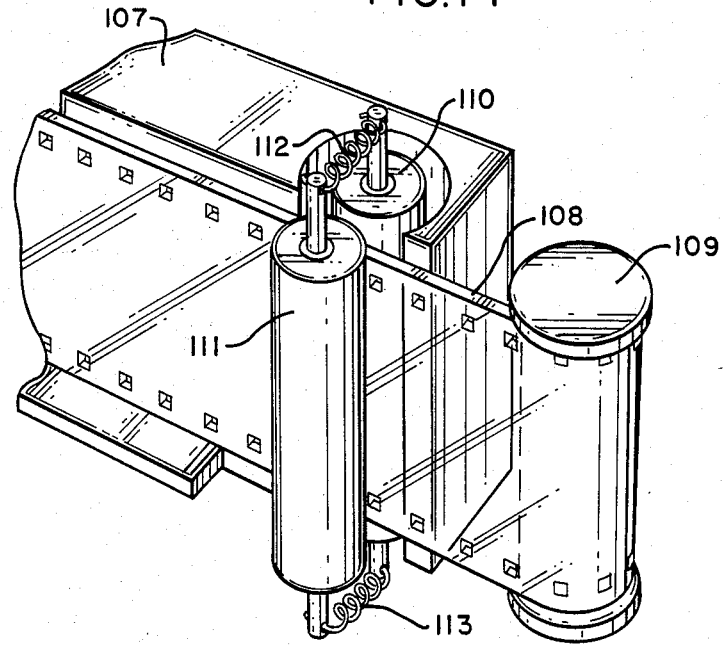
FIG. 15 is a fragmentary perspective view illustrating an additional feature of the present invention which may be used with any of the previously described embodiments.

Referring now to FIG. 15, there is shown a still further modified gate structure 107 for a film 108 from a guide roller 109. In this embodiment which may be utilized with any of the embodiments described thus far, there is included a pair of rollers 110 and 111 with resilient high friction surface areas mounted adjacent to the entrance end of the aperture. A similar pair of rollers could be mounted adjacent to the exit end of the aperture. The roller surfaces extend through the entire film width of the film 108, the film passing between the rollers as shown and being held flat thereby in the plane of the aperture of the gate, similarly to the action caused by the described rollers 13 and 14 in FIGS. 1 and 7. Appropriate pressure may be provided by upper and lower springs 112 and 113 exerting force on the axles of rotation for the rollers 110 and 111 to press and hold the film firmly therebetween. The provision of such pairs of rollers is particularly useful when film is fed straight past a guide roller wherein only line contact is available for the film. The provision of a second roller will enable holding of the film against the one roller under slight pressure. In this arrangement, generated film flutter is inhibited.

The above really operates as a substitute where insufficient room is available for wrapping the film partially about a roller such as the rollers 97 and 98 shown in FIG. 14.

Referring now to FIGS. 16 through 21, there are shown further variations of the manner of lifting the film away from the glass plate of the aperture during transport.

Figure 16:
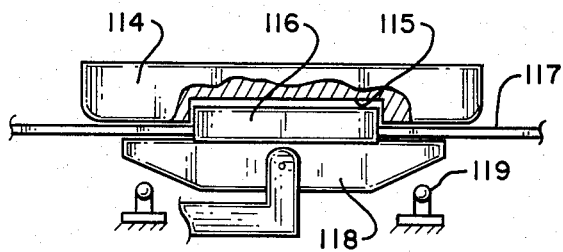
FIG. 16 is a top fragmentary broken away view of a film gate with a modified means for lifting film away from the gate aperture during transport wherein the components are shown in their positions during the dwell period of the film.
Figure 17:
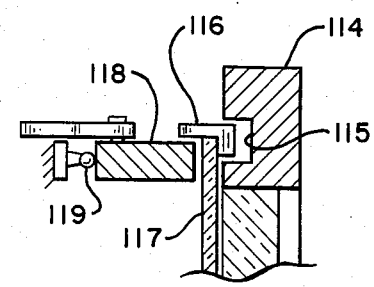
FIG. 17 is a fragmentary cross section of the components of FIG. 16 showing the side rotated ninety degrees.

Considering first the variation shown in FIGS. 16 and 17, there is provided a film gate 114 provided with upper and lower cavities such as indicated at 115 for accommodating an elongated bar hook 116. The bar hook 116 hooks about the upper marginal edge of a film 117. Bar 116 is secured to pressure pad 118. The lift-off or moving away motion of pressure pad 118 is limited by appropriate stops such as indicated at 119.

FIG. 17 illustrates the arrangement of the bar hook 116 engaging over the top edge of the film 117.

Figure 18:
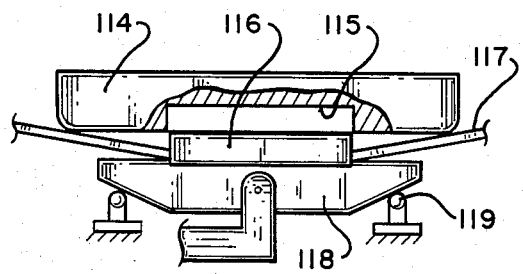
FIG. 18 is a view similar to FIG. 16 showing the relative position of the components during the transport of the film.
Figure 19:
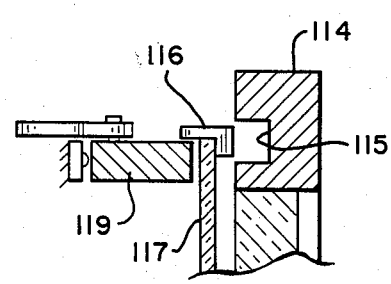
FIG. 19 is a view similar to FIG. 17 showing a cross section of the structure of FIG. 18.

FIGS. 18 and 19 are the same as FIGS. 16 and 17 but show the film pulled away from the aperture by the hook bar 16 during transport. In the positions illustrated in 18 and 19, the pad 118 has engaged the stop 119 and the hook bar 116 is moved almost out of the guide cavity 115 in the gate 114. It will be noted that the film 117 no longer engages the front surface of the aperture. As in the other embodiments, the movement is greatly exaggerated in FIGS. 18 and 19 in order to make the action clear.

Figure 20:
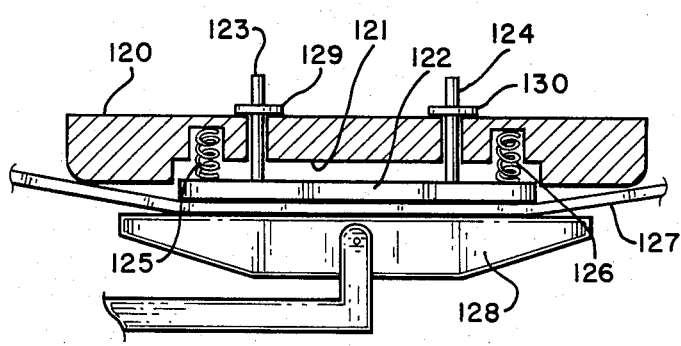
FIG. 20 is another fragmentary broken away plan view of a film gate with yet a further means for lifting film from the aperture during film transport.
Figure 21:
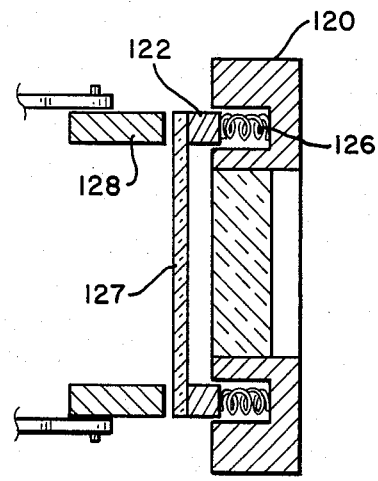
FIG. 21 is a fragmentary cross section of the structure of FIG. 20 showing the side rotated ninety degrees.

In the embodiment of FIG. 20, there is provided a film gate 120 having upper and lower cavities 121 for accommodating pressure bars 122. Guide pins 123 and 124 connect to the pressure bar 122 and serve to guide it in rectilinear back and forth motion. Springs 125 and 126 bias pressure bar 122 outwardly against the film 127 and pressure pad 128. In the showing of FIG. 20 and FIG. 21, the pressure pad 122 has been urged outwardly as the pad 128 is retracted to lift the film from the film gate. Outward movement of the pressure bar 122 is limited by the stop washers 129 and 130. whereby the film is disengaged from the pad 128 during transport.

From FIG. 21, it will be appreciated that both the upper and lower marginal edges of the film are engaged by appropriate pressure bars 122. The same situation obtains with respect to the hook bars 116 described in FIGS. 16 through 19.

As mentioned heretofore, it is to be understood that most of the component features described in the different embodiments may be interchanged. Thus, for example, the film pressure pads or registration pin mechanisms or the embodiment shown in FIG. 1 may be substituted for those shown in FIG. 7 and vice versa.

Various other changes falling clearly within the scope and spirit of this invention will occur to those skilled in the art. The motion picture film gate and registration system accordingly is not to be thought of as limited to the specific examples set forth merely for illustrative purposes.

I claim:

1. A motion picture film gate and registration system for motion picture film that is intermittently transported through the gate from one frame to the next, including, in combination:
    (a) a gate having an aperture with solid marginal edge areas;
    (b) pressure pad means;
    (c) means for moving said pressure pad means towards said gate to press marginal edges of said film against said solid marginal edge areas so as to hold the film firmly during the dwell time of the film in said aperture and moving said pressure pad means away from said marginal edges of said film to permit transport of the film to the next frame, said film including perforations along its marginal edges and a part of said pressure pad means including at least one opening for registration with a perforation during the dwell time of said film;
    (d) registration pin means movable into and out of said opening and registering film perforation so that successive film frames are indexed to consistent positons in said gate after coming to rest at the end of the transport period, said pressure pad means stripping the film perforation from said registration pin means when said registration pin means is withdrawn; and
    (e) means for lifting away said film from the plane of said aperture prior to transport of the film, to prevent scratching of the film during transport.

2. The subject matter of claim 1, in which said means for lifting away said film includes small hook pins carried on said pressure pad means and passing over the marginal edge of the film so that when said pad means moves away from said marginal edges, said film is pulled away from the aperture preparatory to transport to the next frame.

3. The subject matter of claim 1, in which said means for lifting away said film includes smoothly defined protrusions adjacent to the entrance and exit ends of said aperture, constituting raised portions from the plane of the aperture so that when tension is placed on the film to transport the same, the raised portions will lift the film away from said marginal edge areas of said aperture.

4. The subject matter of claim 1, in which said film is transported in a horizontal direction and in which said pressure pad means include upper and lower horizontally disposed elongated pads in parallel spaced relationship such that upper and lower longitudinal margins of the film are respectively engaged by said pads during said dwell time, said gate including a lower horizontal ledge disposed beneath said lower pad for guiding the lower longitudinal edge of said film during transport.

5. The subject matter of claim 1, including guide pins carried on said pressure pad means receivable in guide openings in said gate for guiding movement of said pad means in a direction normal to said gate.

6. The subject matter of claim 1, in which said registration pin means is shaped so as to permit entry into a film perforation before the film has come to a complete stop at the end of a transport period.

7. The subject matter of claim 1, including first and second rollers adjacent to the entrance and exit ends of the gate having high friction resilient surfaces, the rollers extending throughout the entire film width including the image area and the film itself wrapping around at least a portion of the periphery of the rollers so that the film is stabilized against flutter by said rollers.

8. The subject matter of claim 4, including first and second rollers adjacent to the entrance and exit ends of the gate, the ends of the rollers having flanges overlying the edge of film in cooperation with said ledge in guiding film during transport thereof.

9. The subject matter of claim 1, including a pair of rollers with resilient high friction surface areas mounted adjacent to the entrance and exit ends of said aperture, the roller surfaces extending through the entire film width, the film passing between the rollers and being held flat thereby in the plane of the aperture.

10. The subject matter of claim 1, in which said means for moving said pressure pad means towards said gate and moving said pressure pad means away from said marginal edges includes guide pins associated with said pressure pad means for guiding movement of the pressure pad means towards and away from said gate; spring means biasing said pins in a direction to urge said pressure pad means away from said gate; stop means to limit the motion of said pressure pad means away from said gate; cam means for engaging said pressure pad means and moving said pressure pad means against said spring means when positioning the pressure pad means against said marginal areas and releasing said pressure pad means so that said spring means can move said pad means away from said marginal areas; and means for moving said cam means.

11. The subject matter of claim 10, including arm means pivoted intermediate its ends and mounting said cam means on one end; spring means exerting a force to overcome the force of said first mentioned spring means on said guide pins exerting a force on the opposite end of said arm means for urging said cam means against said pressure pad means; and stop means for limiting the arcuate movement of said arm means about said pivot to an adjustable position such that the cam means, when activated urges the pad means against said marginal edges in opposition to said first mentioned spring means on said guide pins.

12. The subject matter of claim 1, in which said means for moving said pressure pad means towards and away from said marginal edges includes arms means pivoted intermediate its ends; means mounting said pressure pad means to one end of said arm means; spring means exerting a force on the other end of said arms means in a direction to move the pad means away from said gate; additional spring means of greater strength than said first mentioned spring means; cam means for urging said additional spring means against said other end of said arm means to move the pad means towards said gate; and stop means for limiting the movement of the pad means away from the gate, said cam means leaving said additional spring means when the ca bulge is away from the additional spring means.

13. The subject matter of claim 12, including guide pins associatd with said pressure pad means for guiding movement of the pressure pad means towards and away from said gate, said means mounting said pressure pad means to one end of said arm means including means permitting slight rotational and translational movement so that the pressure pad means can move in a normal direction towards and away from said gate in repsonse to arcuate movement of said one end of the arm means.

14. The subject matter of claim 1 in which said means for lifting away said film includes bar hook means carried on said pad means passing over opposite marginal edges of the film so that when said pad means moves away from said marginal edges, said film is pulled away from the aperture preparatory to transport to the next frame; and stop means for limiting the movement of said pad means away from said marginal edges.

15. The subject matter of claim 1, in which said means for lifting away said film includes pressure bar means, said gate having cavities receiving said pressure bar means and including springs in said cavities for biasing said pressure bar means against the marginal edges of the film overlying the aperture so that when said pad means moves away from the marginal edges, the pressure bar means pushes the film away from the aperture preparatory to transport to the next frame, there being provided stop means in said gate to limit the outward movement of said bar means from said cavities.

16. The subject matter of claim 1, in which said registration pin means includes cam means and cam follower means slidably mounted for movement towards and away from the film and carrying registration pins, movement of said cam means moving said registration pins into said peforation; spring means biasing said follower means into engagement with said cam means; and stop means lifiting movement of the pins away from the film so that said follower means can lift free of said cam means when said pins are out of registration position.

17. The subject matter of claim 16, in which said cam means and cam follower means are adjustably mounted so that the registration pins can be adjusted relative to the film position.

* * * * *